United States Patent [19]

Oliver

[11] 3,977,707

[45] Aug. 31, 1976

[54] BALL JOINT

[75] Inventor: John P. Oliver, Houston, Tex.

[73] Assignee: Cameron Iron Works, Inc., Houston, Tex.

[22] Filed: Jan. 20, 1975

[21] Appl. No.: 542,294

[52] U.S. Cl. .................................................. 285/265
[51] Int. Cl.[2] ........................................ F16L 27/04
[58] Field of Search ........................... 285/265, 263

[56] References Cited
UNITED STATES PATENTS

| | | | |
|---|---|---|---|
| 1,220,270 | 3/1917 | Phillips | 285/265 X |
| 1,222,682 | 4/1917 | Schreiber | 285/265 |

*Primary Examiner*—Wayne L. Shedd
*Attorney, Agent, or Firm*—W. F. Hyer; Marvin B. Eickenroht

[57] ABSTRACT

A ball joint having tubular end members connected by a gimbal ring for pivoting without relative axial rotation, and pressure balanced sleeves extending between the end members within the gimbal ring to provide a fluid-tight flowway through the joint.

13 Claims, 4 Drawing Figures

BALL JOINT

This invention relates generally to ball joints, and, more particularly, to improvements in ball joints of the type through which fluid may be conducted. In one of its aspects, it relates to improvements in joints of this type having end members which are free to pivot angularly but held against relative axial rotation.

Ball joints of this type are installed as part of a riser pipe connected at its lower end to an underwater wellhead and extending upwardly to a drilling vessel at water level, the pivoting of the joint permitting the vessel to move off a position directly above the wellhead. The riser pipe provides an upward continuation of the bore of the wellhead to receive a drill string for extension from the vessel into the well. During drilling of the well, drilling mud is circulated downwardly through the string and upwardly through the annulus between the string and the riser pipe. Additional fluid conduits, such as choke and kill lines, are carried on the outside of the riser pipe for connection at their lower ends to the wellhead, the resistance of the end members to rotation preventing these lines from becoming twisted.

In conventional joints of this type, one tubular end member is provided with an extension having a concave spherical surface which is made in two or more parts to permit it to be clamped about a mating, convex spherical bearing surface on an extension of the other tubular end member, and pins prevent the members from rotating axially as they pivot angularly relative to one another. The spherical surfaces are sealed with respect to one another so as to render the flowway through the joint fluid-tight by one or more seal rings carried by one such surface for sealing against the other.

The weight of the riser pipe, which may be several hundred feet or more in length, imposes a large load on the joint which, if not balanced, may make it difficult for the joint to pivot or may damage the bearing surfaces and thus permit the joint to leak, or both. Prior attempts to balance this load, and thus insure an easy to swivel and fluid-tight joint, have rendered the joints complicated and expensive to manufacture. Furthermore, even though the riser pipe may be held in tension so as to substantially eliminate this load, the bearing surfaces are also loaded by a force due to the internal pressure of drilling mud which exceeds that of the surrounding water, acting to separate the joint.

During drilling operations, the drill string causes wear on the flowway through the joint, particularly when the end members are pivoted relative to one another. It is therefore desirable that parts of the flowway most susceptible to wear be replaceable.

The primary object of this invention is to provide a joint of this type in which externally applied axial loads, such as that due to the weight of a riser pipe, are not imposed on the sealing surfaces.

Another object is to provide such a joint in which internal loads on such surfaces are pressure balanced in a relatively simple and inexpensive manner; and, more particularly, in which they are balanced by means which comprise readily replaceable wear parts.

A further object is to provide such a joint in which the seal ring and surface against which it seals are protected from abrasive particles in the fluid conducted through the joint.

These and other objects are accomplished, in accordance with the illustrated embodiment of the invention, by a ball joint having its tubular end members connected by means which permits them to pivot angularly, preferably without rotating axially, relative to one another. Thus, a first pair of arms connects one end member to a gimbal ring for pivoting about a first axis, and a second pair of arms connects the other end member to the gimbal ring for pivoting about a second axis, with the axes being perpendicular to one another and lying in a plane perpendicular to the axis of the end members when disposed coaxially.

A pair of sleeves extend from one end member to the other within the connecting arms and gimbal ring so as to provide a fluid passageway through the joint, with one end of each sleeve being releasably and sealably connected to one end member and the other end of one sleeve being arranged within and sealed with respect to the other end of the other sleeve. The other end of such one sleeve includes a spherical surface having a center lying generally on the aforementioned plane and aligned axes and disposed closely within an internal surface of the other end of the other sleeve, so that the sleeves are free to pivot with the end members, and a seal ring is carried by the one surface for sealing against the other. Since the load due to the riser pipe, whether in compression or tension, is carried by the pins connecting the arms on the end members to the gimbal ring, the seal surfaces of the sleeve are isolated therefrom.

Preferably, the sleeves are sealed with respect to one another and the end members to which they are connected along substantially equal diameters so that they are substantially pressure balanced, regardless of the pressure differential between drilling mud within and water without the joint. Consequently, the connections of the sleeves to their respective end members may be of relatively weak, inexpensive construction. More particularly, the internal surface of the other sleeve is generally cylindrical, and the seal ring is carried by the internal surface for sealing against the spherical surface generally within the aforementioned plane. Thus, the sleeves, which may be replaced when worn, may be manufactured with relatively large end-to-end tolerance, and the end members may be pivoted to a maximum extent with respect to one another.

Figure 1:
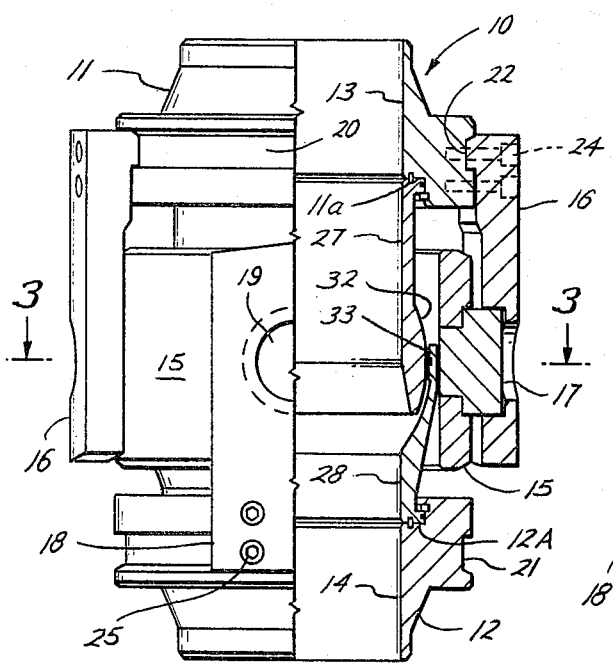
FIG. 1 is a view of one side of the ball joint, partly in elevation and partly in section, as seen along broken line 1—1 of FIG. 3.

With reference now to the details of the above-described drawings, the overall joint, which is indicated in its entirety by reference character 10, includes a pair of tubular members 11 and 12 at its opposite ends, each adapted to have its outer end connected to an adjacent part of a flowline (not shown) such as a riser pipe of the type above described. As shown in FIG. 1, the end members may be disposed in a position in which they are coaxial of one another — i.e., the bore 13 through tubular end member 11 is axially aligned with the bore 14 through tubular end member 12. However, as will be understood from the description to follow, one or more of the end members may be pivoted to a position in which their axes are disposed angularly to one another. However, as will also be understood from the description to follow, regardless of the angular inclination of the end members, the joint provides a relatively smooth continuation of the flowline in which it is connected.

The end members 11 and 12 are connected to one another through a gimbal ring 15 which permits them to pivot, but which prevents axial rotation of one with respect to the other. Thus, a first pair of arms 16 are mounted on the upper end member 11 and pivotally connected to opposite sides of the gimbal ring 15 by means of coaxial pivot pins 17, and a pair of arms 18 are mounted on the end member 12 and pivotally connected to opposite sides of the gimbal ring 15 by means of coaxial pivot pins 19. The axes of the pins 17 and 19 are perpendicular to one another and lie in a plane perpendicular to the axis of the aligned end members.

The tubular end members are provided with radially enlarged ends, having grooves 20 and 21 thereabout. Each of the arms 16 has an internal flange 22 on its upper end which fits within groove 20, and each of the arms 18 has an internal flange 23 for fitting within groove 21. When so received, the arms 16 extend downwardly from the enlarged end of tubular member 11, and arms 18 extend upwardly from the enlarged portion of tubular member 12. The arms 16 and 18 are secured to tubular members 11 and 12 by bolts 24 and 25, respectively.

Figure 4:
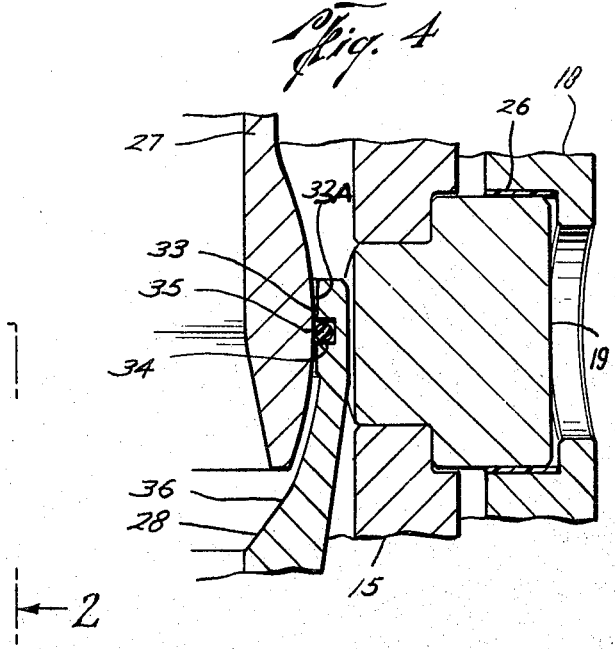
FIG. 4 is an enlarged detailed view of the portion of the joint indicated by the arrow numbered 4 in FIG. 2.

The free ends of the arms 16 and 18 have holes therein which fit over the outer ends of pivot pins 17 and 19, respectively, and the inner ends of the pins are press-fitted within holes in the gimbal ring 15. Pins 17 and 19 are T-shaped in cross section, and their enlarged outer ends are received within Teflon bearings 26 (FIG. 4) in counterbores in the holes in the arms.

A first sleeve 27 extends downwardly from tubular member 11, and a second sleeve 28 extends upwardly from tubular member 12, both within gimbal ring 15, with the lower end of sleeve 27 arranged within the upper end of sleeve 28. More particularly, each of the sleeves is sealed with respect to the tubular end member to which it is connected as well as with respect to the other, so as to provide a fluid-tight flowway connecting the bores 13 and 14 of the tubular end members.

Figure 2:
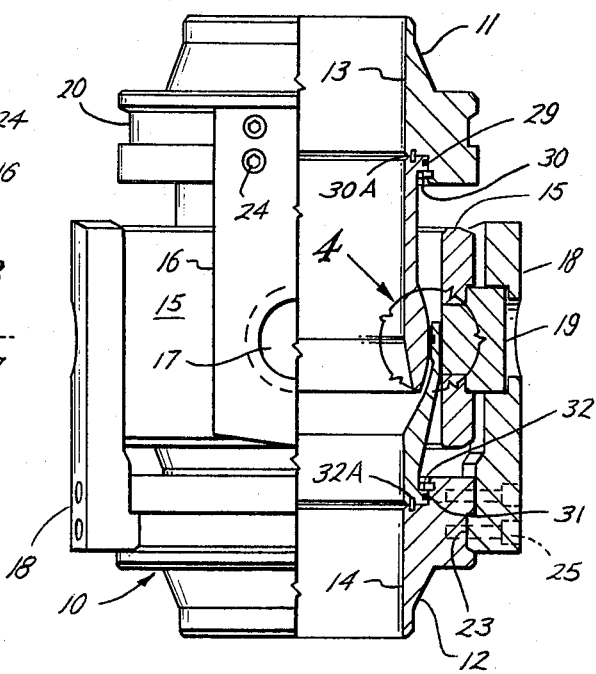
FIG. 2 is a view of another side of the ball joint, partly in elevation and partly in section, as seen along broken line 2—2 of FIG. 3.
Figure 3:
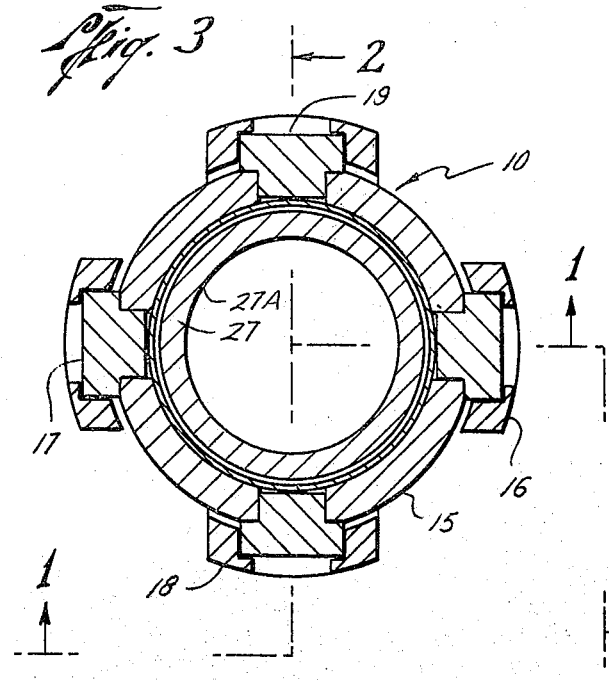
FIG. 3 is a cross-sectional view of the joint, as seen along broken line 3—3 of FIG. 1.

As shown in FIGS. 1 and 2, the lower end of tubular member 11 is counterbored at 11A to receive the upper end of sleeve 27, with the bore through the sleeve providing a smooth continuation of bore 13. The upper end of the sleeve 27 is sealed with respect to tubular member 11 by means of a seal ring 29 carried about its outer diameter. Sleeve 27 is connected to member 11 by means of a snap ring 30 engaging a groove in the counterbore and disposed beneath a shoulder on the bottom side of the enlarged upper end of sleeve 27, and is held against rotation by a pin 30A.

The upper end of tubular member 12 is counterbored at 12A to receive the lower end of sleeve 28 and has a bore therethrough which forms a smooth continuation of bore 14. The lower end of sleeve 28 is sealed with respect to member 12 by means of a seal ring 31 carried about its enlarged end. Sleeve 28 is connected to member 12 by means of a snap ring 32 engaging a groove about the recess in member 12, and is held against rotation by pin 32A.

The upper end of sleeve 28 is outwardly enlarged to receive the lower end of sleeve 27, with the bores through the sleeves being of the same diameter and coaxial when bores 13 and 14 of the end members are axially aligned. More particularly, the lower end of sleeve 27 has an outer surface 33A which is spherical about a center lying substantially in the aforementioned plane, and fits closely within a cylindrical surface 33 on the inside of the upper end of sleeve 28, so that, as previously described, the sleeves are free to pivot with the end members 11 and 12.

More particularly, these surfaces are sealed with respect to one another by means of a seal ring 35 (FIG. 4) carried within a groove 34 in cylindrical surface 33, and lying substantially within the above mentioned plane so as to sealably engage the spherical surface 33A. Thus, as will be appreciated, the two members may pivot with respect to one another a maximum amount, and sealing contact between seal ring 35 and the spherical surface 33A is maintained despite relatively large tolerances in the connections of the sleeves to the end members. At the same time, the enlarged upper end of sleeve 28 fits closely within the gimbal ring so that, with the gimbal ring in turn fitting closely within arms 17 and 19, the overall joint has a relatively small cross section. The inner side of lower sleeve 28 also includes a generally spherically shaped surface 36 beneath cylindrical surface 33 which is generally concentric with and close to spherical surface 33A of sleeve 27.

The seal ring 35 seals against surface 33A, and seal rings 29 and 31 seal against recesses 11A and 12A, respectively, along substantially equal diameters. Thus, sleeves 27 and 28 are pressure balanced, regardless of the differential in pressure inside and outside of the joint, so that the snap wires 30 and 32 connecting the sleeves to the end members may be of weak construction.

As previously described, and as will be understood, each of sleeves 27 and 28 may be easily and quickly replaced, upon disconnection of the end members, in the event their inner surfaces become excessively worn.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the present invention without departing from the scope thereof, it is to be understood that all matter herein set forth or shown in the accompanying drawings is to be interpreted as illustrative and not in a limiting sense.

The invention having been described, what is claimed is:

1. A ball joint, comprising a pair of tubular end members, means connecting the end members for pivoting between positions in which their axes are aligned and angularly disposed with respect to one another, a pair of replaceable sleeves within the connecting means each having one end releasably connected to one of the end members, the other end of one sleeve having a convex surface which is spherical about a center at substantially the intersection of said axes, and the other end of the other sleeve having an internal surface close about the spherical surface, a seal ring carried by one surface for sealing against the other, and means sealing between the one end of each sleeve and the end member to which it is connected.

2. A ball joint of the character defined in claim 1, wherein said sealing means between the one end of each sleeve and the end member to which it is connected seals along a diameter substantially equal to that of the sealing engagement of said seal ring with said spherical surface.

3. A ball joint of the character defined in claim 1, wherein said internal surface is cylindrical, and said seal ring is carried by said internal surface for sealing against said spherical surface generally along a plane passing through the intersection of said axes and perpendicular to the axes when aligned.

4. A ball joint of the character defined in claim 3, wherein said other sleeve has a generally spherically shaped concave surface which is concentric with and spaced a short distance from the convex spherical surface on said one sleeve.

5. A ball joint of the character defined in claim 2, wherein said internal surface is cylindrical, and said seal ring is carried by said internal surface for sealing against said spherical surface generally along a plane passing through the intersection of said axes and perpendicular to the axes when aligned.

6. A ball joint of the character defined in claim 5, wherein said other sleeve has a generally spherically shaped concave surface which is concentric with and spaced a short distance from the convex spherical surface on said one sleeve.

7. A ball joint of the character defined in claim 1, wherein said connecting means includes means preventing axial rotation of the end members with respect to one another.

8. A ball joint, comprising a pair of tubular end members, means connecting the end members for pivoting between positions in which their axes are aligned and angularly disposed with respect to one another, including a gimbal ring, a first pair of arms connecting one end member to the gimbal ring for rotation about a first axis, and a second pair of arms connecting the other end member to the gimbal ring for rotation about a second axis, said first and second axes being perpendicular to one another and lying substantially in a plane perpendicular to the axis of the end members when they are aligned, a pair of replaceable sleeves within the connecting means each having one end releasably connected to one of the end members, the other end of one sleeve having a convex surface which is spherical about a center at substantially the intersection of said axes, and the other end of the other sleeve having an internal surface close about the spherical surface, a seal ring carried by one surface for sealing against the other, and means sealing between the one end of each sleeve and the end member to which it is connectd.

9. A ball joint of the character defined in claim 8, wherein said sealing means between the one end of each sleeve and the end member to which it is connected seals along a diameter substantially equal to that of the sealing engagement of said seal ring with said spherical surface.

10. A ball joint of the character defined in claim 8, wherein said internal surface is cylindrical, and said seal ring is carried by said internal surface for sealing against said spherical surface generally along said plane.

11. A ball joint of the character defined in claim 10, wherein said other sleeve has a generally spherically shaped concave surface which is concentric with and spaced a short distance from the convex spherical surface on said one sleeve.

12. A ball joint of the character defined in claim 9, wherein said internal surface is cylindrical, and said seal ring is carried by said internal surface for sealing against said spherical surface generally along said plane.

13. A ball joint of the character defined in claim 12, wherein said other sleeve has a generally spherically shaped concave surface which is concentric with and spaced a short distance from the convex spherical surface on said one sleeve.

* * * * *